(12) United States Patent
Rodionov et al.

(10) Patent No.: US 12,508,717 B2
(45) Date of Patent: Dec. 30, 2025

(54) FLEXIBLE AUTOMATIC FOOD PROCESSING AND CLIENT ORDERS EXECUTION MACHINE

(71) Applicant: X Robotics, Inc., San Francisco, CA (US)

(72) Inventors: Denis Rodionov, San Francisco, CA (US); Roman Sharapov, San Francisco, CA (US)

(73) Assignee: X ROBOTICS, INC., San Francisco, CA (US)

( * ) Notice: Subject to any disclaimer, the term of this patent is extended or adjusted under 35 U.S.C. 154(b) by 1171 days.

(21) Appl. No.: 17/035,559

(22) Filed: Sep. 28, 2020

(65) Prior Publication Data
US 2021/0094188 A1 Apr. 1, 2021

Related U.S. Application Data

(63) Continuation-in-part of application No. PCT/US2020/052982, filed on Sep. 27, 2020.
(Continued)

(51) Int. Cl.
*B25J 11/00* (2006.01)
*A21B 7/00* (2006.01)
(Continued)

(52) U.S. Cl.
CPC ........... *B25J 11/0045* (2013.01); *A21B 7/005* (2013.01); *A21C 9/04* (2013.01); *A21C 11/008* (2013.01); *B25J 9/0084* (2013.01); *B25J 9/0093* (2013.01)

(58) Field of Classification Search
CPC .... B25J 11/0045; B25J 9/0084; B25J 9/0093; A21B 7/005; A21C 9/04; A21C 11/008
See application file for complete search history.

(56) References Cited

U.S. PATENT DOCUMENTS 3,851,554 A 12/1974 Papai
5,997,924 A 12/1999 Olander, Jr.
(Continued)

FOREIGN PATENT DOCUMENTS

CN 103037697 B 12/2016
EP 4033905 A1 8/2022
(Continued)

OTHER PUBLICATIONS

European Search Report issued Aug. 15, 2023, on a EP Application No. EP 20 86 8965.
(Continued)

*Primary Examiner* — Brian W Jennison
(74) *Attorney, Agent, or Firm* — Franklin & Associates International Inc; Matthew F. Lambrinos

(57) ABSTRACT

The present technology is to be used in used in pizzerias and other food restaurants to fully substitute manual labor in food processing. The present technology utilizes a modular principle for flexibility. It allows tuning the machine to (1) different dishes like pizza, chicken wings or hamburgers (2) different sizes and shapes of the room and (3) different orders capacity. The machine utilizes autonomous driving robots with autopilot for food logistics between ingredient stations and for the refilling of the stations with ingredients. Autonomous autopilot robot allows to precisely position the food to cook, e.g. pizza, with the ingredient station for precisely topping or other food processing. Precise interposition allows deep food customization by a client with the possibility of making drawings on food using ingredients. The matrix modular structure of the machine allows parallel orders execution. It is extremely beneficial in peak hours.

20 Claims, 15 Drawing Sheets

Related U.S. Application Data

(60) Provisional application No. 63/065,447, filed on Aug. 13, 2020, provisional application No. 62/907,483, filed on Sep. 27, 2019.

(51) Int. Cl.
  *A21C 9/04* (2006.01)
  *A21C 11/00* (2006.01)
  *B25J 9/00* (2006.01)

(56) References Cited

U.S. PATENT DOCUMENTS

| | | |
|---|---|---|
| 8,710,408 B2 | 4/2014 | Khatchadourian |
| 9,974,314 B2 | 5/2018 | Fritz-Jung |
| 2002/0176921 A1 | 11/2002 | Torghele et al. |
| 2010/0212516 A1 | 8/2010 | Westberg |
| 2011/0209661 A1* | 9/2011 | Fritz-Jung ............ A21C 9/04 118/712 |
| 2013/0331989 A1 | 12/2013 | Umeno et al. |
| 2016/0067866 A1 | 3/2016 | Sekar |
| 2017/0290345 A1* | 10/2017 | Garden ............ A21C 9/08 |
| 2018/0075506 A1* | 3/2018 | Burkhard ............ B65B 59/003 |
| 2020/0249660 A1* | 8/2020 | Rao ............ G05B 13/0265 |

FOREIGN PATENT DOCUMENTS

| | | |
|---|---|---|
| JP | 2007020520 A | 2/2007 |
| WO | 2017101015 A1 | 6/2017 |
| WO | 2017134156 A1 | 8/2017 |
| WO | 2019070733 A1 | 4/2019 |
| WO | 2021062343 A1 | 4/2021 |

OTHER PUBLICATIONS

International Search Report issued Dec. 17, 2020, on a PCT Application No. PCT/US2020/052,982, filed Sep. 27, 2020, in the name of Denis Rodionov.

Written Opinion issued Dec. 17, 2020, on a PCT Application No. PCT/US2020/052,982, filed Sep. 27, 2020, in the name of Denis Rodionov.

* cited by examiner

FLEXIBLE AUTOMATIC FOOD PROCESSING AND CLIENT ORDERS EXECUTION MACHINE

CROSS-REFERENCE TO RELATED APPLICATION

This application claims the benefit of priority under 35 U.S.C. § 119 (c) based upon co-pending U.S. provisional patent application Ser. No. 62/907,483 filed on Sep. 27, 2019 and U.S. provisional patent application Ser. No. 63/065,447 filed on Aug. 13, 2020. The entire disclosure of these prior provisional applications is incorporated herein by reference.

This application is a continuation-in-part under 35 U.S.C. § 120 based upon co-pending International Application No. PCT/US20/52982 filed on Sep. 27, 2020, which claimed priority to U.S. provisional application 62/907,483 filed on Sep. 27, 2019 and U.S. provisional patent application 63/065,447 filed on Aug. 13, 2020. The entire disclosure of the prior application is incorporated herein by reference.

BACKGROUND

Technical Field

Generally, the present technology relates to the field of automatic food processing. Specifically, the present technology relates to the machine that can cook food and execute client orders in a flexible and parallel mode, with minimal or virtually no human assistance. The present technology relates to a flexible automatic food processing and client orders execution machine for use in connection with preparing and cooking food items per client orders utilizing flexible automatic food processing.

Background Description

Due to permanently increasing wages there is pressure on restaurants concerning economical efficiency. The possible salvation is the automatization of the restaurants. Nowadays there is no fully automatic restaurant in the world. Most of the restaurants use scattered tools and machines, with manual control and logistics between those.

Many attempts were executed to automatization of the restaurants. Most of it uses universal robotics in the process. U.S. Pat. No. 5,997,924A uses a robot arm to move pizza from the topping line to the oven. Topping is executed manually. U.S. Pat. No. 9,974,314B2 also uses a robot arm to move the pizza between stations. Patent WO 2017/134156 A1 uses 2 robot arms for pizza sauce spreading and moving the pizza from dough press to ingredients dispenser and then to carousel oven. In all the examples the robot arm copies of the human behavior and has constraints related to it. The throughput capacity of one arm is equal to one employee.

Several patents use CNC-like machines with linear motion modules (e.g., US20160067866A1). It is a precise mechanism with excess accuracy and complex installation and calibration process. It is not flexible, allows only consistent work with limited speed and capacity. There is a group of patents with the invention of the pizza vending machine (U.S. Pat. No. 8,710,408B2, WO2017101015A1). However, the design of all these machines doesn't allow to cook restaurant quality pizza because of limited ingredients, frozen dough and a number of other quality constraints related to the vending format.

A need exists for a new and novel flexible automatic food processing and client orders execution machine that can be used for preparing and cooking food items per client orders utilizing flexible automatic food processing. In this regard, the present technology substantially fulfills this need. In this respect, the flexible automatic food processing and client orders execution machine according to the present technology substantially departs from the conventional concepts and designs of the prior art, and in doing so provides an apparatus primarily developed for the purpose of preparing and cooking food items per client orders utilizing flexible automatic food processing.

SUMMARY

According to some aspects, an automated pizza system, may comprise: a food processing machine with autonomous robots that move on a bed independently and simultaneously and transfer processing food between ingredients stations; a refilling system for a food processing machine that includes autonomous robots; said autonomous robots move on said bed independently and simultaneously and transfer ingredients from a storage place or cooler, to ingredient stations and dispensers; said food processing machine further includes ingredients toppings process executed by rotational and linear movements of the autonomous robot those are related and synchronized to the feed of ingredients of the dispenser; wherein said food processing machine further includes modular matrix frame with a bidirectional array of the interchangeable dispensers that allows parallel orders processing; and said food processing machine which allows food customization by a client with text and draws, wherein said text and draws are transformed on top of the food using sauces or other ingredients by relative movements of autonomous robots and intelligent ingredients dispensers. It is executed on the top of the food using sauces or other ingredients by relative movements of autonomous robots and ingredients dispenser.

According to some aspects, the automated pizza system, may comprise a food processing machine with autonomous robots that move on a bed independently and simultaneously and transfer processing food between ingredients stations; a refilling system for a food processing machine that includes autonomous robots; said autonomous robots move on said bed independently and simultaneously and transfer ingredients from a storage place or cooler, to ingredient stations and dispensers; said food processing machine further includes ingredients toppings process executed by rotational and linear movements of the autonomous robot those are related and synchronized to the feed of ingredients of the dispenser; wherein said food processing machine further includes a modular matrix frame with a bidirectional array of the interchangeable dispensers that allows parallel orders processing; said food processing machine which allows food customization by a client with text and draws, wherein said text and draws are transformed on top of the food using sauces or other ingredients by relative movements of autonomous robots and intelligent ingredients dispensers. It is executed on the top of the food using sauces or other ingredients by relative movements of autonomous robots and ingredients dispenser, food ingredients dispenser (as a part of the machine) that can spread low doses of ingredients around the pizza crust or dish. It is executed by rotation of a food ingredients container with a nozzle according to the information from ingredients passing sensors; and sausage slicer (as a part of the machine) that can slice sausages and lay sausage slices on the pizza crust or dish precisely. It uses a disk blade and a sausage revolver that rotate simultaneously. Rotation of the sausage revolver allows feeding of the sausages on the disk blade;

According to yet some other aspects an automated pizza process for making a pizza using an automated pizza system is provided. The automated pizza process may comprise the steps of; moving autonomous robots on a platform both independently and simultaneously; transferring the processing of food between a plurality of ingredients stations; refilling a food processing machine that includes use of autonomous robots; moving said autonomous robots on said platform both independently and simultaneously to transfer ingredients from a storage place or cooler, to intelligent ingredient stations and intelligent dispensers; initiating, based on executed programmatic processes, rotational and linear movements of the indicated autonomous robot that is related and synchronized to the feed of the ingredients of the dispenser. using as modular matrix frame with a frame bidirectional array of the interchangeable dispensers that allows parallel orders processing; and enabling food processing and food customization according to a client order.

According to yet some other aspects, an ingredient dispenser, food ingredients dispenser is provided for use with a flexible automatic food processing and client orders execution machine. The dispenser can spread low doses of ingredients around a pizza crust or dish. It is executed by rotation of a food ingredients container with a nozzle according to the information from ingredients passing sensors.

According to yet some other aspects, a sausage slicer is provided for use with a flexible automatic food processing and client orders execution machine. It can slice sausages and lay sausage slices on a pizza crust or dish precisely. It uses a disk blade and a sausage revolver that rotate simultaneously. Rotation of the sausage revolver allows feeding of the sausages on the disk blade.

According to yet some other aspects, one or more aforementioned elements of the flexible automatic food processing and client orders execution machine or methods are provided separately for use with the machine.

According to other aspects, the present technology can include a food preparing system. One or more food robots can autonomously move on a table. The food robots can include a rotatable header for receiving a food item. An ingredient dispensing frame can be positioned above the table and can include one or more modular ingredient dispensers configured to dispense an ingredient on to the food item supported by the header of the food robot positioned therebelow. One or more ingredient robots can autonomously move on an ingredient bed. The ingredient robots can be configured to receive the ingredient, transport the ingredient to at least one of the ingredient dispensers, and dispense the ingredient in the ingredient dispenser. The ingredient bed can be separate from the table. A food cooking station can be configured to receive the header and the food item thereon, and cook the food item. A post-cooking station can be configured to receive the header and the cooked food item thereon from the food cooking station, and remove the cooked food item from the header. A header station can be configured to receive the header from the post-cooking station and provide the header to the food robot.

According to another aspect, the present technology can include a non-transitory computer readable medium with an executable program stored thereon comprising instructions for execution by at least one processing unit for making food, such that the instructions when executed by the at least one processing unit causes the at least one processing unit to instruct autonomous food robots to move on a platform independently and simultaneously. Instruct the food robots to transfer a foot item supported thereon to one or more ingredient dispensers, and instruct the ingredient dispensers to dispense an ingredient to the food item when the food robot is positioned therebelow. Instruct ingredient robots to transport ingredients to the ingredient dispensers independently and simultaneously with moving the food robots. Instruct a first of the food robots to initiate, based on executed programmatic processes, rotational and linear movements of the first food robot that is related and synchronized to the dispensing of the ingredient of at least one of the ingredient dispensers.

According yet to another aspect, the present technology can include a client-side electronic system for making food. The system can include a memory and a processor that are respectively configured to store and execute software instructions, including instructions that are organized into a food robot component configured or configurable to instruct one or more food robots to move and operate based on a food order received by the system. An ingredient dispenser component configured or configurable to instruct one or more ingredient dispensers to dispense an ingredient stored therein. An ingredient robot component configured or configurable to instruct the ingredient robots to receive an ingredient from ingredient storage and transfer the ingredient to at least one of the ingredient dispensers requiring refill. The food robot component can be further configured or configurable to instruct at least one of the food robots to move to a position below at least one of the ingredient dispensers, and to move in rotational and linear movements to receive the ingredient.

According to yet some other aspects, a dough station is provided for use with a flexible automatic food processing and client orders execution machine. The dough station that can include a food transfer system configured to capture a food item and transfer it to a food item support. The food item support is moveable from a food hopper that receives the food item from the food transfer system to a food item forming mechanism. The food item forming mechanism can be configured to form the food item located on the food item support from a first shape to a second shape different to that of the first shape. The food item support can be configured to pivot to transfer the food item to the header of the food robots adjacently positioned thereto.

According to still yet some other aspects, one or more modular ingredient dispensers is provided for use with a flexible automatic food processing and client orders execution machine. The modular ingredient dispensers can include a container configured to receive the ingredient from one of the ingredient robots, a pivoting mechanism configured to pivot the container so that the ingredient received therein is transferred to a funnel, and a vibration device configured to vibrate the container, According to still yet some other aspects, a post-cooking station is provided for use with a flexible automatic food processing and client orders execution machine. The post-cooking station can include a cooked food item moving mechanism, and a header conveyor. The cooked food item moving mechanism can be configured to transfer the cooked food item off the header. The header conveyor can be configured to move the header to a top section of the header station.

According to still some other aspects, a header station is provided for use with a flexible automatic food processing and client orders execution machine. The header station can be configured to receive the header from the post-cooking station in a stacked configuration with multiple empty headers, and can be configured to provide at least one empty header to the food robots when positioned therebelow.

According to still some other aspects, a food robot is provided for use with a flexible automatic food processing and client orders execution machine. The food robot can include a universal clamp configured to couple with a portion of a header that receives a food item, and can include a rotating drive device configured to rotate the universal clamp and the header coupled thereto, Some or all embodiments can include an ingredient storage configured to receive multiple ingredient containers and provide at least one of the ingredient containers to the ingredient robot.

In some or all embodiments, the ingredient storage can be a plurality of modular freezers each featuring a container aperture and a container feeding mechanism configured to advance the ingredient containers toward the container aperture.

In some or all embodiments, the ingredient robots can include an ingredient container hopper configured to receive at least one of the ingredient containers from the container aperture.

In some or all embodiments, the food robots can each include a universal clamp configured to couple with a portion of the header, and a rotating drive device configured to rotate the universal clamp and the header coupled thereto.

In some or all embodiments, the food robots can each be configured to travel in a linear or lateral direction along the table, and simultaneously rotate the header while under the ingredient dispenser to distribute the ingredient being dispensed on the food item.

Some or all embodiments can include a robot elevator configured to receive the food robots and elevate the food robots to an entrance of the food cooking station.

In some or all embodiments, the table can include unique codes thereon readable by a camera on the food robots for determining position coordinates on the table.

Some or all embodiments can include a computer system having at least one processing unit configured to receive a food order, provide instructions to the food robots, provide instructions to the ingredient robots, and provide instructions to the dispensers.

In some or all embodiments, the header station can be configured to receive the header from the post-cooking station in a stacked configuration with multiple empty headers, and is configured to provide at least one empty header to the food robots when positioned therebelow.

In some or all embodiments, the post-cooking station can include a cooked food item moving mechanism, and a header conveyor. The cooked food item moving mechanism can be configured to transfer the cooked food item off the header. The header conveyor can be configured to move the header to a top section of the header station.

Some or all embodiments can include a food station including a food transfer system configured to capture a food item and transfer it to a food item support.

In some or all embodiments, the food station further can include a food item forming mechanism configured to form the food item located on the food item support from a first shape to a second shape different to that of the first shape.

In some or all embodiments, the food item support can be configured to pivot to transfer the food item to the header of the food robots adjacently positioned thereto.

In some or all embodiments, the food item forming mechanism can include a pair of opposing conical rollers configured to rotate and press against the food item.

In some or all embodiments, one of the modular ingredient dispensers can include a container configured to receive the ingredient from one of the ingredient robots, a pivoting mechanism configured to pivot the container so that the ingredient received therein is transferred to a funnel, and a vibration device configured to vibrate the container.

In some or all embodiments, one of the modular ingredient dispensers includes a container configured to receive the ingredient from one of the ingredient robots, a rotating disk blade configured to slice the ingredient received in the container, and a nozzle configured to receive the sliced ingredient from the disk blade.

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

It is another object of the present technology to provide a new and novel flexible automatic food processing and client orders execution machine that may be easily and efficiently manufactured and marketed.

An even further object of the present technology is to provide a new and novel flexible automatic food processing and client orders execution machine that has a low cost of manufacture with regard to both materials and labor, and which accordingly is then susceptible of low prices of sale to the consuming public, thereby making such flexible automatic food processing and client orders execution machine economically available to the buying public.

Still another object of the present technology is to provide a new flexible automatic food processing and client orders execution machine that provides in the apparatuses and methods of the prior art some of the advantages thereof, while simultaneously overcoming some of the disadvantages normally associated therewith.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology. Whilst multiple objects of the present technology have been identified herein, it will be understood that the claimed present technology is not limited to meeting most or all of the objects identified and that some embodiments of the present technology may meet only one such object or none at all.

BRIEF DESCRIPTION OF THE DRAWINGS

The present technology will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE EMBODIMENTS

Figure 1:
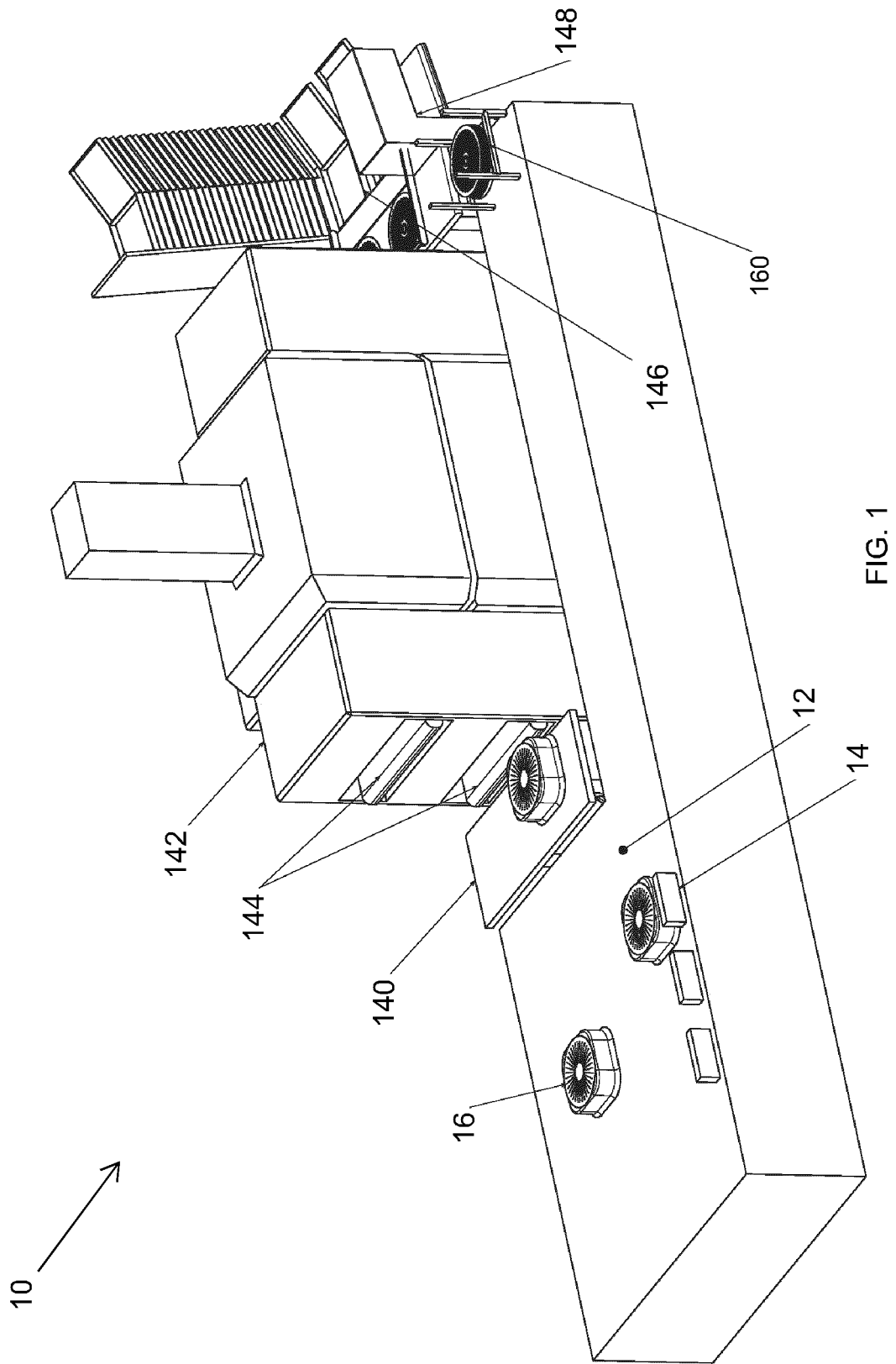
FIG. 1 is a front-perspective view of an embodiment of the flexible automatic food processing and client orders execution machine including the table and food logistics autonomous robots constructed in accordance with the principles of the present technology.

In the following description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

As identified herein before, there is a group of patents with the invention of the pizza vending machine (U.S. Pat. No. 8,710,408B2, WO2017101015A1). However, the design of all these machines doesn't allow to cook restaurant quality pizza because of limited ingredients, frozen dough and a number of other quality constraints related to the vending format.

The disadvantages of existing technology include manual food assembly and processing, which results in mistakes in orders due to the human factor; Unreliable quality due to the variation of process as a result of human factor; low economic efficiency due to extremely high labor costs and labor-related costs;

Existing automatic food processing machines using universal robotics also have many disadvantages compared to the present technology, and are solved by the present technology. Some of the disadvantages of existing prior art include high costs of the machine due to the usage of universal robotics and low capacity in peak hours due to the waterfall process. That is, the waterfall process is defined by one universal robot is equal or even lower in speed than one employee. It is impossible to speed up the process except to add more universal robots in parallel. Due to the high prices of the robots, it is economically inefficient, space-consuming and increases the complexity of the system.

In the exemplary, the following description of the present technology is directed toward a pizza preparing, cooking and packaging machine, system and method, and in no way limiting in scope. However, it can be appreciated that the present technology can be utilized with and for the preparation of other foods.

The automatic food processing machine 10 consists of several main parts:

1) Free-shaped modular table 12, which is used as a bed for food logistics autonomous robots;
2) Food logistics autonomous robots 16 that carry pizza or other food from one stage to another; several food logistics robots can move independently and simultaneously. The upper part of the robot has a universal clamp 18. Universal clamp allows to switch headers, e.g. pizza screen 46, a container 48 for ready-made products such as drinks or salads or any other header. A universal clamp interface allows using any number of different headers. The robot is equipped with an axis 20 and motor drive to rotate the pizza screen 46 or another robot header.
3) Dispenser matrix 80 which is located above the table with food logistics robots. Dispenser matrix is a free-shaped modular frame with a bidirectional array of slots for different dispensers 82 with different toppings for pizza or other food to process. Dispensers 82 are "plug and play" with fast and easy for frame installation and deinstallation and interchangeable with one another and can be used in parallel.
4) Different stations around the table have interfaces with food logistics robots, e.g. dough spinner 60, oven 142, packaging station 146, client delivery station, drinks station, etc. The robot can bring to or grab the pizza or other food from the stations.
5) Upper side of the dispenser matrix forms the second layer that is used as a bed 130 for ingredients robots,
6) Modular cooler 132 with ingredients containers and containers feeding system. Head of the cooler connected with the dispenser matrix 80 and has apertures 136 for containers 134 to be grabbed by the ingredients robot 40.

The following process shows how the machine cooks pizza. Other dishes are cooked using the same method with modifications that depends on the receipt and the dish. The disclosed pizza processing description in no way limits the inventive matter specified herein; rather, the following description is intended to be exemplary only, to clarify and illustrate certain embodiments of the present technology.

Figure 5:
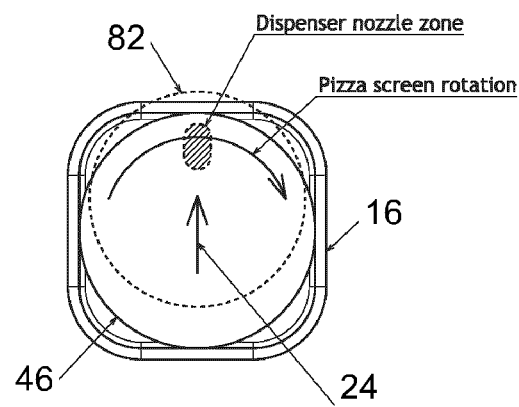
FIG. 5 is a schematic of the pizza topping using a dispenser and a food logistics robot.
Figure 6:
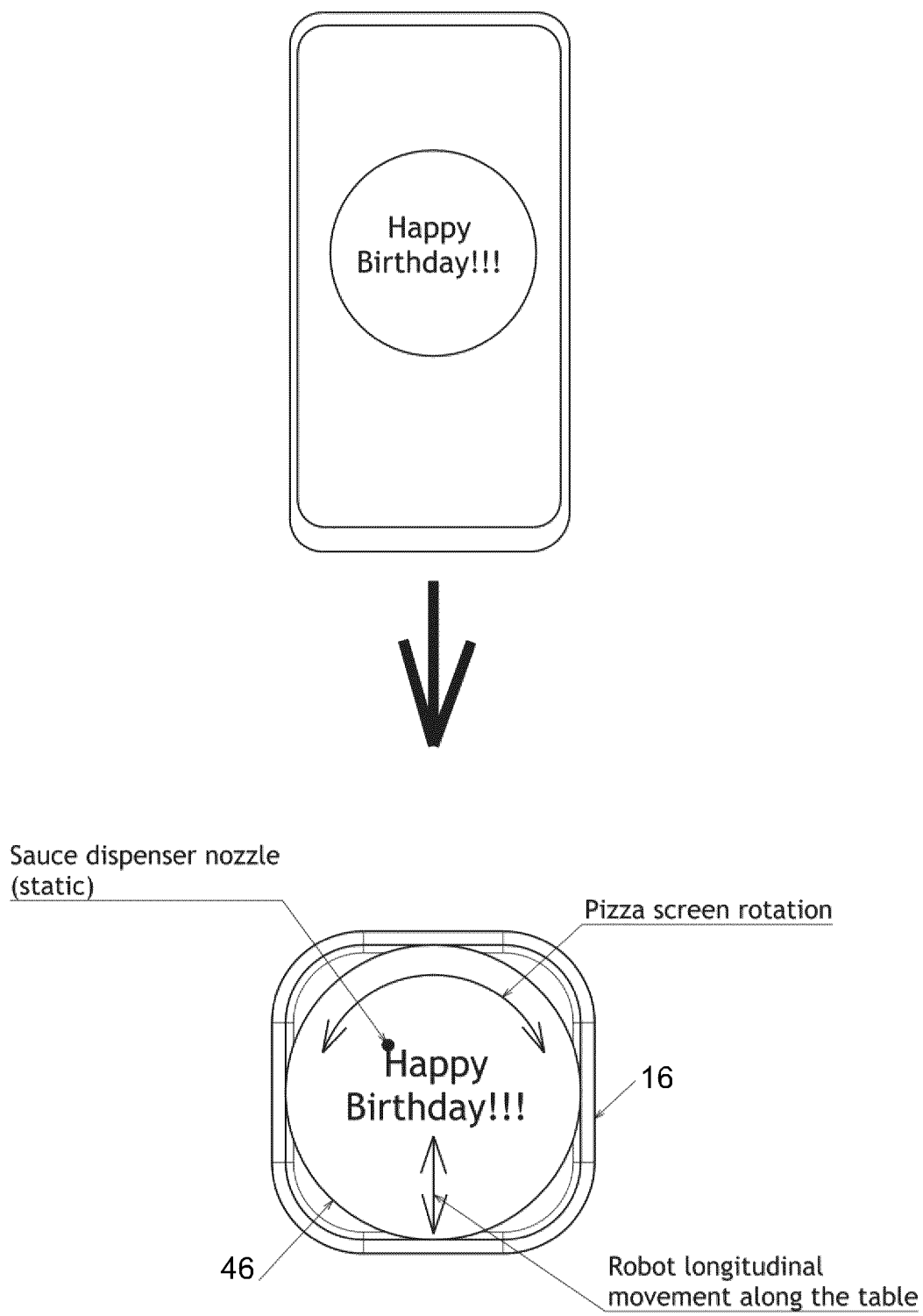
FIG. 6 is schematic of the smartphone client utilizable to upload the text, symbols or image to the robot that spreads the ingredients to replicate customer's design.

1) A new order arrived. The first available food logistics autonomous robot takes off from the charging station 14 and goes to the dough spinner station 60. The system has an adaptive algorithm that allows optimal parallel utilization of several robots and dispensers.
2) Dough spinner station 60 received the dough ball from the cartridge, spins it and transfer the crust to the food logistics robot 16.
3) Food logistics robot 16 moves to the next dispenser 82 according to the pizza receipt and position itself precisely under the dispenser.
4) Food logistics robot 16 rotates the pizza screen and moves linearly along the x or y coordinate. The rotation of the screen and the linear movement of the robot are synchronized and controlled by a computer program to precisely positioning of the pizza under the dispenser 82. These two movements allow to cover the full surface of the pizza (see FIG. 5). The dispenser feed rate is also synchronized with the robot movement and rotation. It allows dynamically and uniformly spread the sauce and toppings on the pizza.
5) Low dosage dispenser 84 spread low doses of ingredients around the pizza crust or dish. Dispenser holds a container 90 with ingredients. The Ingredient container 90 has a nozzle 100 in the upper part. Dispenser can turn over the container 90 around axis 96 and ingredients fall out through the container nozzle to the pass-through ingredients funnel 106. Sensor 110 detects the falling of the ingredients and triggers back rotation of the container to stop falling of ingredients. It allows small batches of ingredients for low dosage. In the same time sensor 112 detects ingredients and triggers rotation of pizza crust or dish. A vibration motor 108 vibrates the container 90 for free movement of ingredients. Computer vision checks the even spreading of the ingredients on the crust.
6) Sausage slicer 114 slices sausages and lay sausage slices on the pizza crust or dish 46 precisely. It uses a disk blade 124 and a sausage revolver 116 that rotate simultaneously. Rotation of the sausage revolver 116 allows the feeding of the sausages on the disk blade 124. Slices fall down through the slice nozzle 128 on the crust or dish 46. A passing sensor 129 detects the pass of the slice and triggers the rotation of the pizza crust or dish 46. Computer vision checks the even spreading of the slices on the crust.
7) The client can design own pizza with exact positioning of the ingredients or write down their own phrase/draw that will be embodied in the real pizza.
8) After pizza topping the Food logistics robot moves to a conveyor oven station 142. There is an elevator 140 in front of the oven that lifts the robot 16 to the oven level which has a free space for the pizza. The robot transfers the screen with pizza to the conveyor of the oven 142.
9) Vacant robot 16 moves to the screen station 160 to grab a screen 46 and moves back to the charging station 14. It waits for the next order in the idle mode.
10) After the oven, there is the same elevator as in the front. The baked pizza is grabbed by the same or another robot, moved to the cutting 148 and packaging stations 146 and transferred by the robot to the client delivery station.
11) The same or another food logistics robot 16 can gather the ready-made client orders such as drinks or salads from according stations and brings it directly to the client delivery station.
12) By switching modular dispensers 82 in the dispenser matrix 80, stations and robot headers it is possible to make other food by the machine such as burgers, chicken wings, etc.
13) When one of the dispensers 82 becomes empty, the ingredients robot 40 takes a container 134 fed by cooler 132, fix it in the hopper 42, brings it to the dispenser inlet 81 and pours the content into the dispenser 82.
14) Cooler (a subset of a "storage place") with ingredients is designed to allow the autonomous working of the machine for a long time. Depending on the configuration it can be a day or several days. When there is a need to refill the cooler, the supply team member brings the containers with ingredients from the processing center or prepare the containers directly in the restaurant. The cooler is refilled with the containers manually.

List of Sensors

Food logistics robot—lidar and computer vision, encoders on wheels' motors, gyroscope, and accelerometer;

Ingredients robot—lidar and computer vision, encoders on wheels' motors, gyroscope, and accelerometer;

Intelligent or low dosage dispenser—computer vision (for dispensing control and correction, for robot position checking), digital connection with autonomous robots, optical sensors for ingredients passing detection;

Slicer dispenser—computer vision (for dispensing control and correction, for robot position checking), digital connection with autonomous robots, optical sensors for ingredients passing detection;

Dough opening station—computer vision (for crust size and thickness control and correction);

Ingredients storage place—computer vision (for ingredients amount control and automatic reordering);

Oven exit and packaging station—computer vision (for quality control);

In some embodiments by lidar and computer vision food logistics robot knows its own relative position. In some embodiments, food logistics robot defines its own position using computer vision. Image 138 on the table 12, 80 encodes the coordinates. Camera 39 on the robot 16, 40 shoots code on the table 12, 80. Robot's computer recognizes the code. Algorithm processes the image to decrease the error. The system allows the robot to know its own position with 1 mm accuracy. According to the food receipt, there is an order of dispensers' attendance. The AI-dispatcher sends a receipt of the current order to the robot. The robot knows each dispenser position in the dispensers' matrix. It goes autonomous to the next dispenser using lidar and computer vision system described above. The intelligent dispenser has its own camera which corrects the exact position of the robot relatively to the dispenser. Dispenser computer vision compares the actual position of the robot with the reference one and sends commands to the robot's motors to move it accordingly. After achieving the right position the robot and dispenser start to execute a program according to the food receipt. The program consists of a sequence of commands for stepped motors or other electrical units of robot and dispenser. The commands control such parameters as the speed of the dispenser feed, amount of ingredient fed, path and speed of robot movement and rotation of the robot header (the list of parameters is not limited). The timing of the program execution is synchronized between robot and dispenser using the digital connection between them.

The program can be standard (compiled for reuse) or unique. When a client makes a text or draws in the restaurant's application, ordering deck or internet site, a computer program renders client text to the commands for robot and dispenser. The commands form the robot movement patch and sauce dispenser feed which execution leads to replication of text or draws using sauce.

Dispenser computer vision watches the process, artificial intelligence compares it with the reference process and make real-time correction in the program to achieve result according to it.

Figure 7:
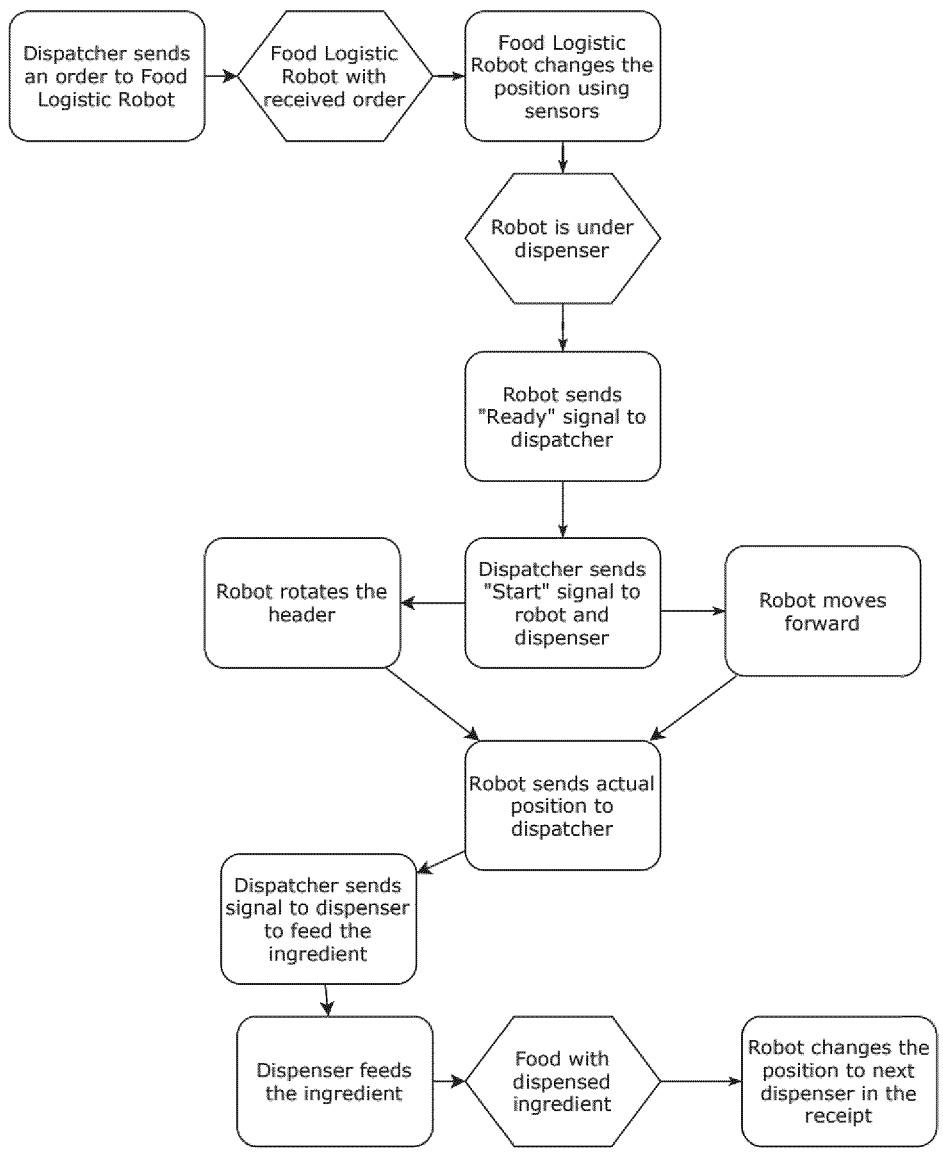
FIG. 7 is a flow-chart explanation of the algorithms.

Referring to FIG. 7, an exemplary method utilizing the present technology can include a food order provided by a dispatcher or a user. The dispatcher or a computer system can send the order to the food logistic robot or robots. The food logistic robot receives the order and changes its position utilizing sensors. In this pizza preparation example, the food logistic robot can maneuver to the dough station for receiving and preparing crust. After which, the food logistic robot can maneuver under one or more of the dispensers corresponding with the received order. The food logistic robot then can send a "Ready" signal to the dispatcher or computer system.

The dispatcher or computer system then sends a "Start" signal to the food logistic robot and the dispenser thereabove. While under the dispenser, the food logistic robot can be operated to rotate the attached header and move forward or backward. The food logistic robot can then send its actual position to the dispatcher or computer system. The dispatcher or computer system then can send to the appropriate dispenser a signal to feed the ingredient. After reception of this signal, the dispenser feeds the ingredient and dispenses it on the crust supported by the food logistic robot.

After which, the food logistic robot can then maneuver to a next dispenser in the receipt, if one is required. This process can be repeated until all the required ingredients are dispensed onto the crust as per the order.

The dispatcher or computer system can then instruct the food logistic robot to maneuver to the robot elevator for transportation to the oven, where the header and pizza is transferred into the oven and the food logistic robot can then maneuver to another station.

During the above process, many food logistic robots can be controlled and operated by the dispatcher or computer system simultaneously, with multiple dispensers being operated simultaneously with a separate food logistic robot.

Even further during the above process, ingredient robots can be instructed by the dispatcher or computer system to maneuver to a container aperture and receive an ingredient container. After which, the dispatcher or computer system can instruct the ingredient robot to maneuver to an appropriate dispenser inlet associated with a dispenser needing refilling. The ingredient robot can then receive instructions from the dispatcher or computer system to release the ingredients from the container or release the ingredient container into the dispenser.

At any time, if any of the food logistic robots 16 and/or the ingredient robots 40 power level is below a predetermined value, then they can maneuver to an open charging station 14, respectively, for recharging.

Further regarding the platform or table 12 and/or the bed 130, the code 138 can be printed or engraved thereon or projecting therefrom. Magnetic, ferrous and/or transmittable elements or wiring can be including on the table 12 and/or the bed 130 to provide coordinate information, power and/or instructions to the food logistic robot 16 and the ingredients robot 40, respectively. The table 12 and/or the bed 130 can include height adjustable means for leveling on an uneven surface. Still further, the table 12 and/or the bed 130 can be modular for ease in transporting, assembling, disassembling and/or expansion.

Figure 4:
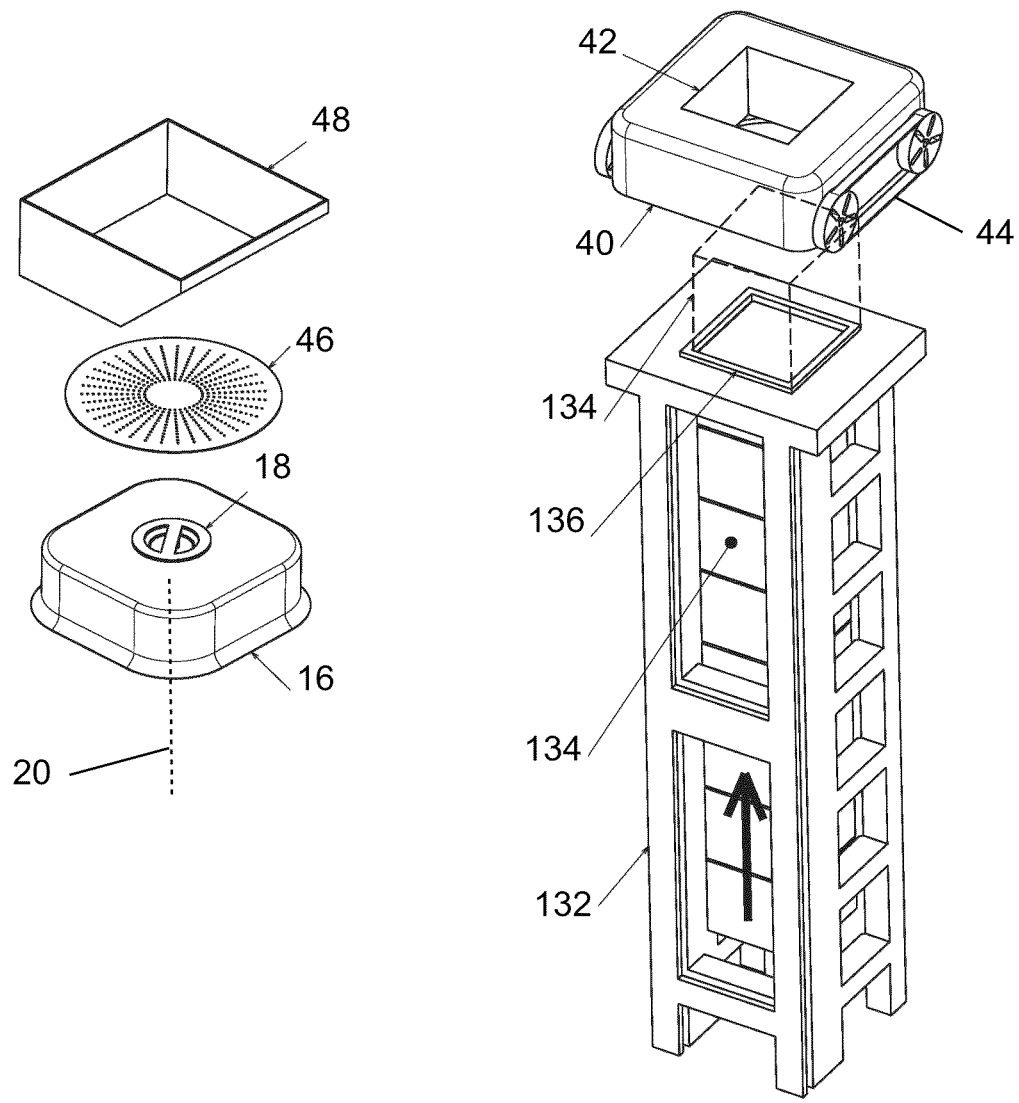
FIG. 4 is a perspective view of the food logistics robot, the ingredient robot and the freezer module of the present technology.
Figure 11:
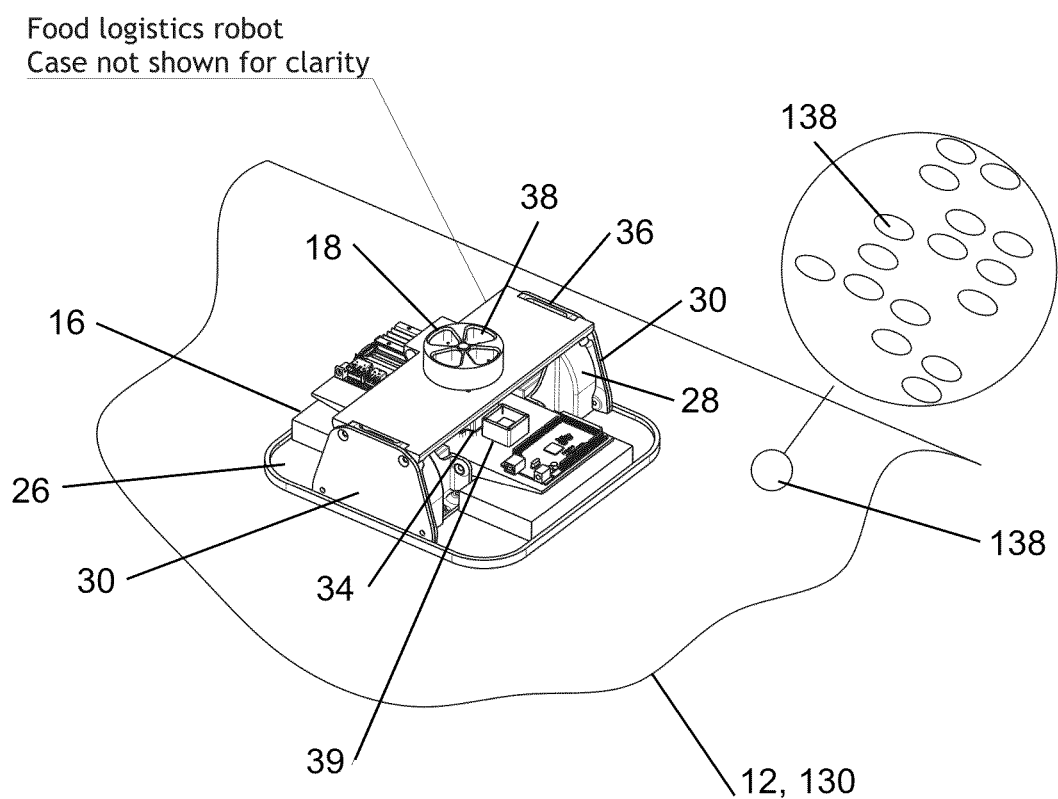
FIG. 11 is a perspective view of the principal scheme of coordinate recognition system.

The food logistics robots 16, as best illustrated in FIGS. 4 and 11, can include a base frame supporting all components. A motive system, such as motor driven wheels and/or endless tracks can be utilized to maneuver the food logistics robots 16 on the table 12. It can be appreciated that other forms of motive means can be utilized, such as but not limited to, aircushion, magnetic levitation or guide tracks. The driving wheels can be supported by vertical supports extending from the base frame, with an upper support attached to each vertical support and spanning across the base frame.

A rotation motor can be supported by the base frame for providing rotational movement of the universal clamp 18 about a rotational axis 20. The rotation motor can be centrally located on the base frame so that the universal clamp 18 rotates about a central axis, or the rotation motor can be located elsewhere on the base frame and operably coupled to the universal clamp 18 by way of gears, transmission or belts.

The universal clamp 18 can include engagement means to grasp or secure the robot header 46, 48 to the food logistics robots 16, while providing rotation thereto. In addition, the food logistics robots 16 can include a tilting means configured to tilt or pivot the robot header 46, 48. This can be accomplished by, but not limited to, a motor or actuator configured to pivot the upper support or configured to push up one side of the robot header 46, 48. The universal clamp 18 can include one or more recesses configured to receive extensions, detents or fingers extending from a bottom of the robot header 46, 48.

The ingredients robot 40 can include a base frame supporting the container hopper 42 or the container hopper 42 can be the base frame. A motive system, such as motor driven wheels and/or endless tracks can be utilized to maneuver the ingredients robot 40 on the bed 130. It can be appreciated that other forms of motive means can be utilized, such as but not limited to, aircushion, magnetic levitation or guide tracks. In the exemplary, a pair of endless tracks can be operably located on opposite sides of the container hopper 42.

To receive one of the containers 134, the ingredients robot 40 can include an opening sized and configured to receive the container 134 therein. The ingredients robot 40 can include an advancing means that is configured to grip a side of the container 134 and advance it into the opening of the hopper 42. The advancing means can be, but not limited to, a motorized belt or track configured to grip the side of the container 134 and raise and/or lower it, a linear actuator configured to raise and/or lower the container 134, or a magnetic system.

The ingredients robot 40 can further include a sensor or transceiver to detect or read information from the container 134 to identify its contents and/or its predetermined destination.

Figure 13:
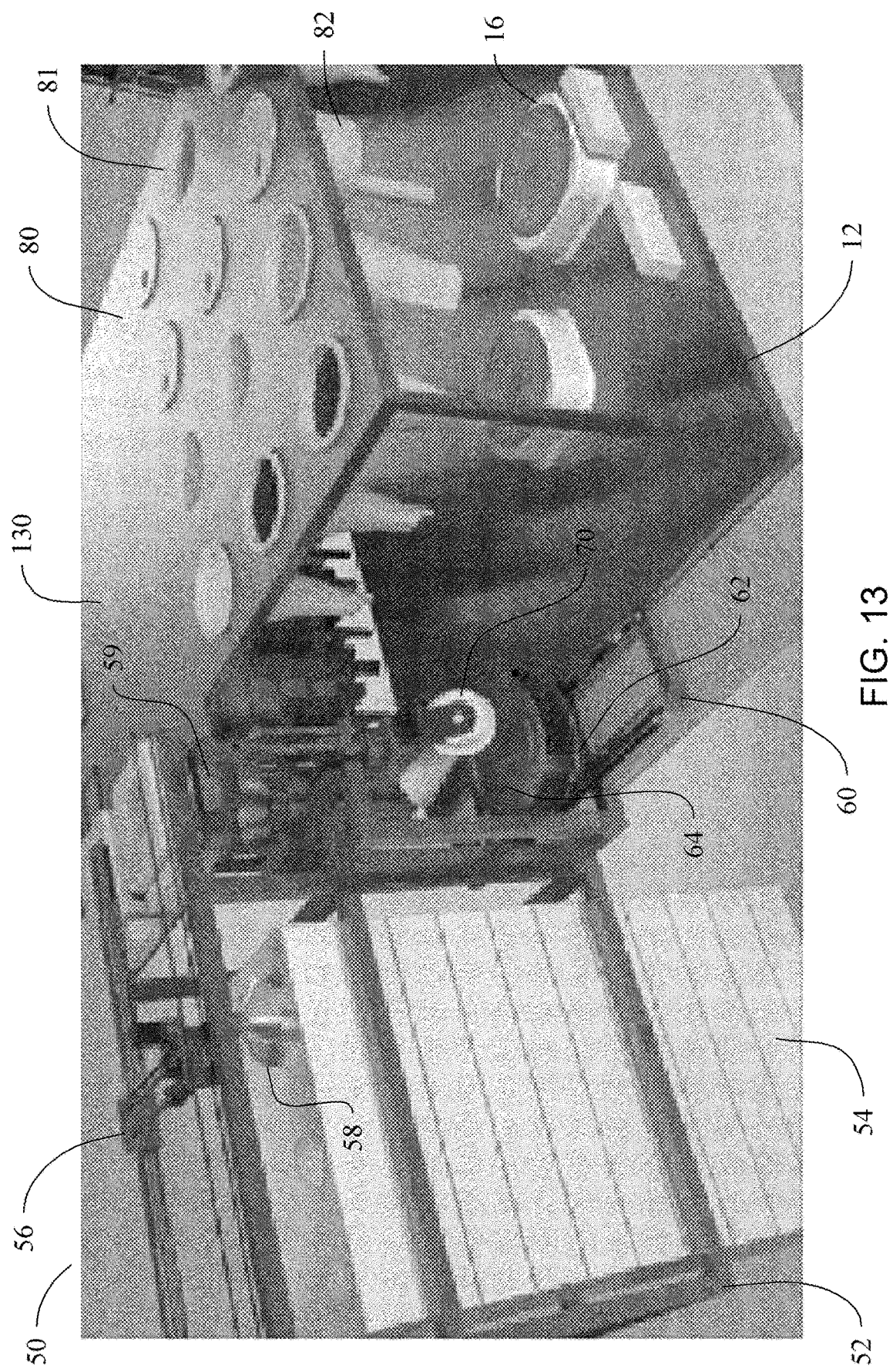
FIG. 13 is a perspective view of the dough station, the dough transfer mechanism, the dough spinner and the dough support.

The dough station 50, as best illustrated in FIGS. 2, 3, 13 and 14, can include a skeletal 52 frame configured to receive stacked trays 54 each having multiple dough balls thereon, An overhead traveling carriage system 56, as best illustrated in FIG. 13, can move over an uppermost tray and position a claw 58 over one of the dough balls. The claw 58 can be lowered and operated to capture the dough ball in the claw 58 and raise it above the tray 54. The carriage system 56 can then move the claw 58 with captured dough ball over a hopper or funnel 59, and then release the dough ball therein. Here, the dough ball can then travel or drop onto the screen 46 of an awaiting dough support 64.

Figure 14:
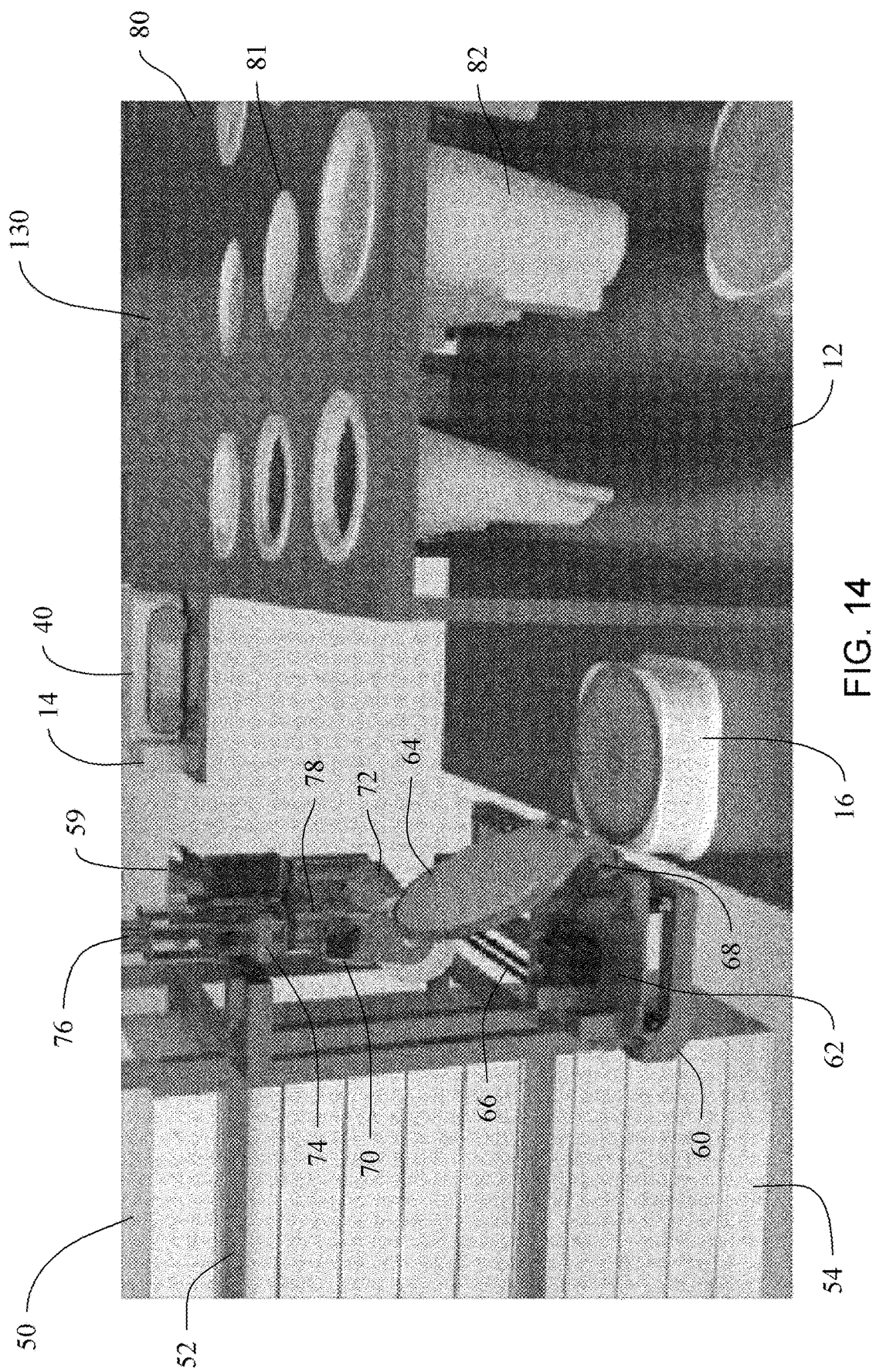
FIG. 14 is an enlarged perspective view of the dough support pivoting to transfer the dough onto the screen of an awaiting food robot.

A dough support positioning system 62, as best illustrated in FIG. 14, can be utilized to position a dough support 64 below the dough hopper 59. The dough support positioning system 62 can be, but not limited to, a moveable carriage or belt 66 configured to move the dough support 64 into different positions and to operate a pivoting means 68. After the bough ball is received on the dough support 64 in a flat position, the dough support positioning system 62 can then move the dough support under the dough spinner 70. Alternatively, the food robot 16 can be utilize to position itself under the dough hopper 59 and then under the dough spinner 70 without utilizing the dough support and its positioning means. Even further in the alternative, the food robot 16 can be operated to spin the screen 46 with the dough ball thereon with the dough spinner 70 extending the rollers 72 thereagainst, thereby omitting the additional motors or drives required to rotate the mount including the rollers 72.

The dough spinner 70 can include two or more rotatable conical rollers 72 opposingly orientated on a mount 74. The mount 74 can be rotatably supported on or from a frame 76 that allows for linear movement of the mount 74 toward the dough ball on the below positioned dough support 64. The rollers 72 can be moved to contact and press the dough ball while simultaneously rotating the mount 74 and/or the rollers 72 to press out, expand and thin the dough ball into a spherical or oval shape. The rollers 72 can be rotated by a motor 78 on the mount 74 or associated with each roller 72, or they can freely rotate upon rotation of the mount 74 and contact with the dough ball. It can be appreciated that the dough spinner 70 can include press cutters to form the dough ball or pressed out dough into other shapes, Once the dough spinner 70 has completed pressing and rolling out the dough ball into a pizza crust, the dough support 64 is pivoting to position or flip the pizza crust onto the screen 46 of an awaiting food robot 12 that was instructed to proceed to the dough station 50 by the computer system 170.

It can be appreciated that while this particular food robot 12 is at the dough station 50, other food robots 12 can be in operation at other stations on the table 12, such as the food dispenser station 80, the charging station 14, the oven station 142, the screen station 160, the packaging station 146, the cutting station 148 and/or the client delivery station.

Figure 2:
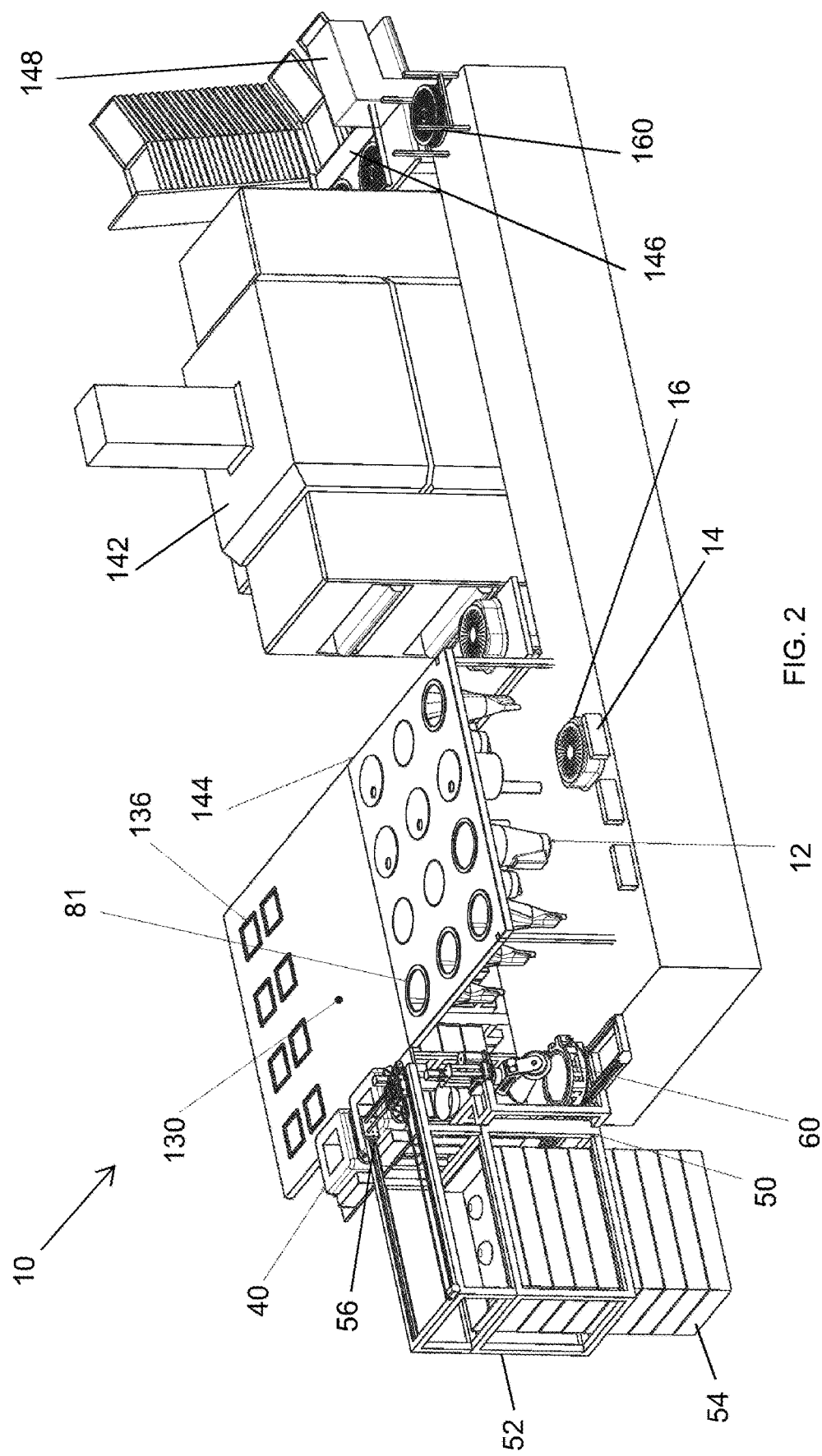
FIG. 2 is a front-perspective view of the flexible automatic food processing and client orders execution machine and the upper level with dispenser matrix and ingredients refill system.
Figure 3:
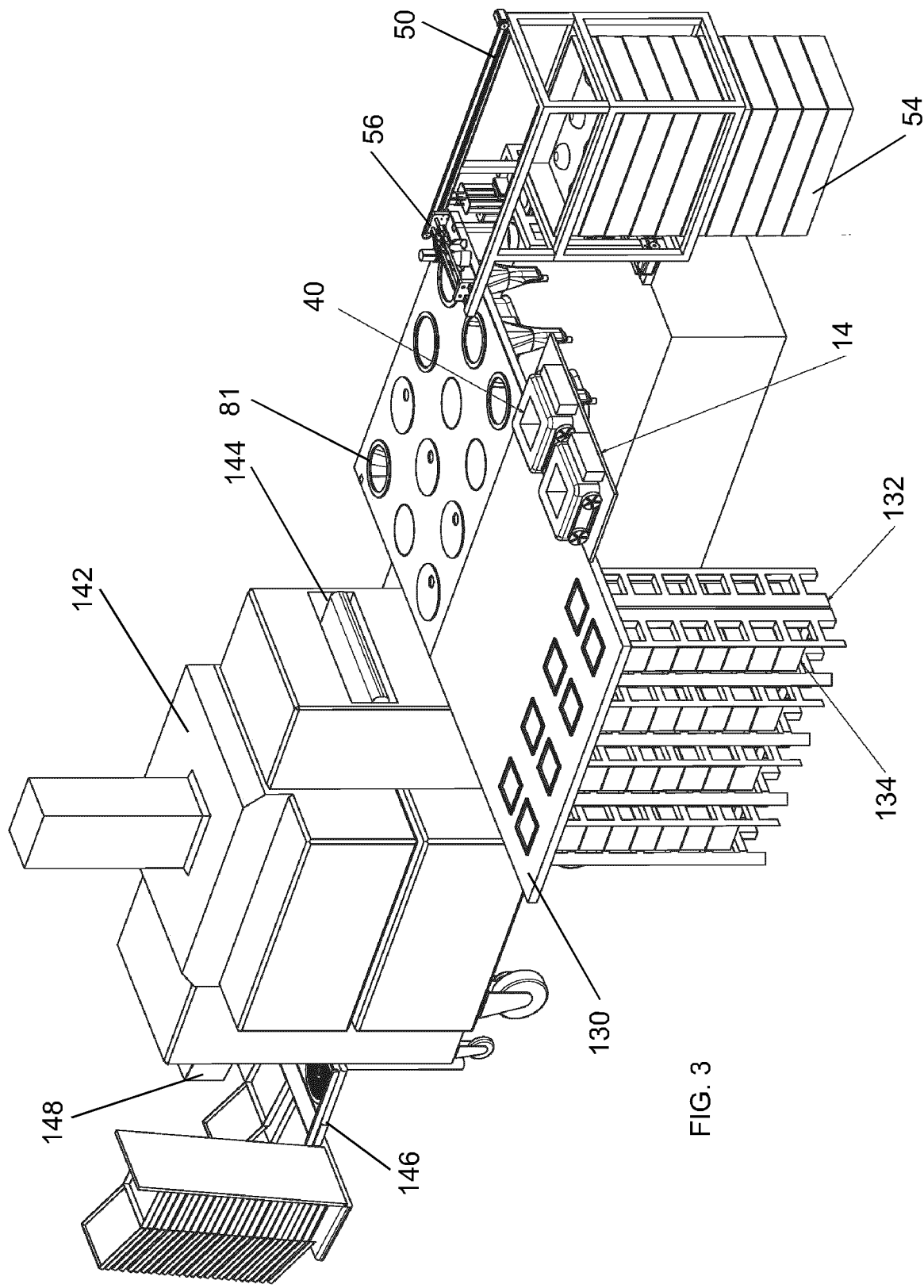
FIG. 3 is a rear-perspective view of the flexible automatic food processing and client orders execution machine and the cooler and ingredients robot view.

The module freezer 132, as best illustrated in FIG. 2-4, can be multiple freezer units each with a tower-like configuration capable of holding a stack of ingredient containers 134, and configured to lift or advance the containers 134 toward the container aperture 136 for pickup by the ingredient robot 40. The container feeding system of the freezer 132 can be capable of raising one or the stack of containers 134 so that one container 134 exits the container aperture 136, and can include a motorized track, ladder or conveyor system, or a linear actuator with ratcheting system. It can be appreciated that human personal can restock the freezers 132 with the containers 134 or additional ingredient robots 40 can be utilized to acquire a container 134 from a remote location and transport it to under the freezer 132 where it can be lifted or raise into the freezer 132.

The bed 130 can be positioned over the freezers 132 and level with the container aperture 136, thereby creating a flat travel surface for the ingredient robots 40. In accordance with the spirit of the present technology, the container aperture 136, the freezer 132 and/or the bed 130 can include means for providing location or coordinate information 138 to the ingredient robot 9 for accurate positioning.

The dispenser matrix or station 80 can include a variety of module and interchangeable dispensers 82. Each dispenser 82 can include identifiable elements capable of being detected by the food robots 16 or captured by its camera 39, thereby provide position, route and/or destination information for the food robot 16. Further, each dispenser 82 can be configured to provide dispenser information to the main computer system for identifying the dispensers and its contents, and its location in the dispenser matrix 80 for accurate routing of the food robots 16.

Figure 8:
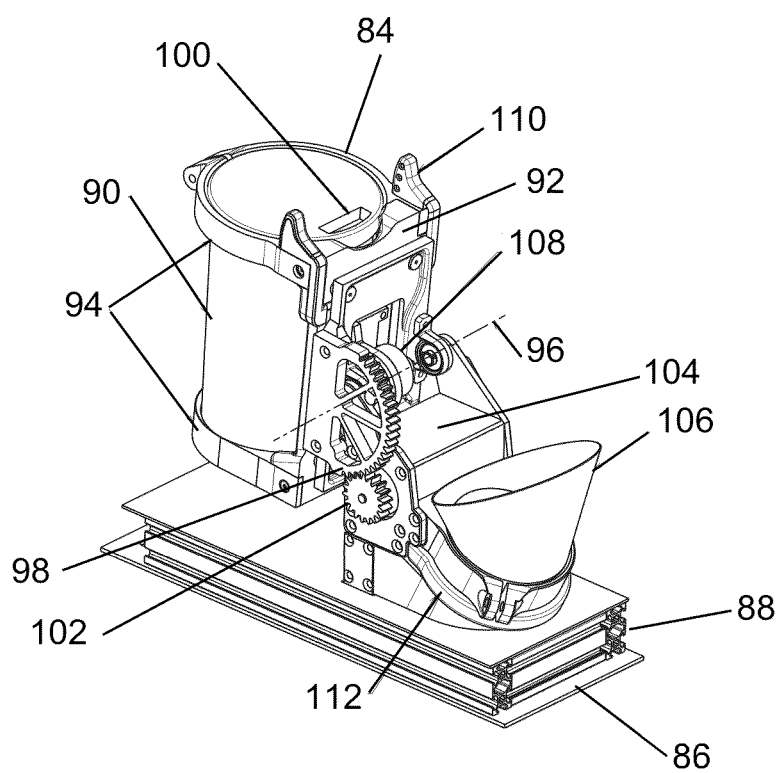
FIG. 8 is a perspective view of the low dosage spreading dispenser structure.
Figure 9:
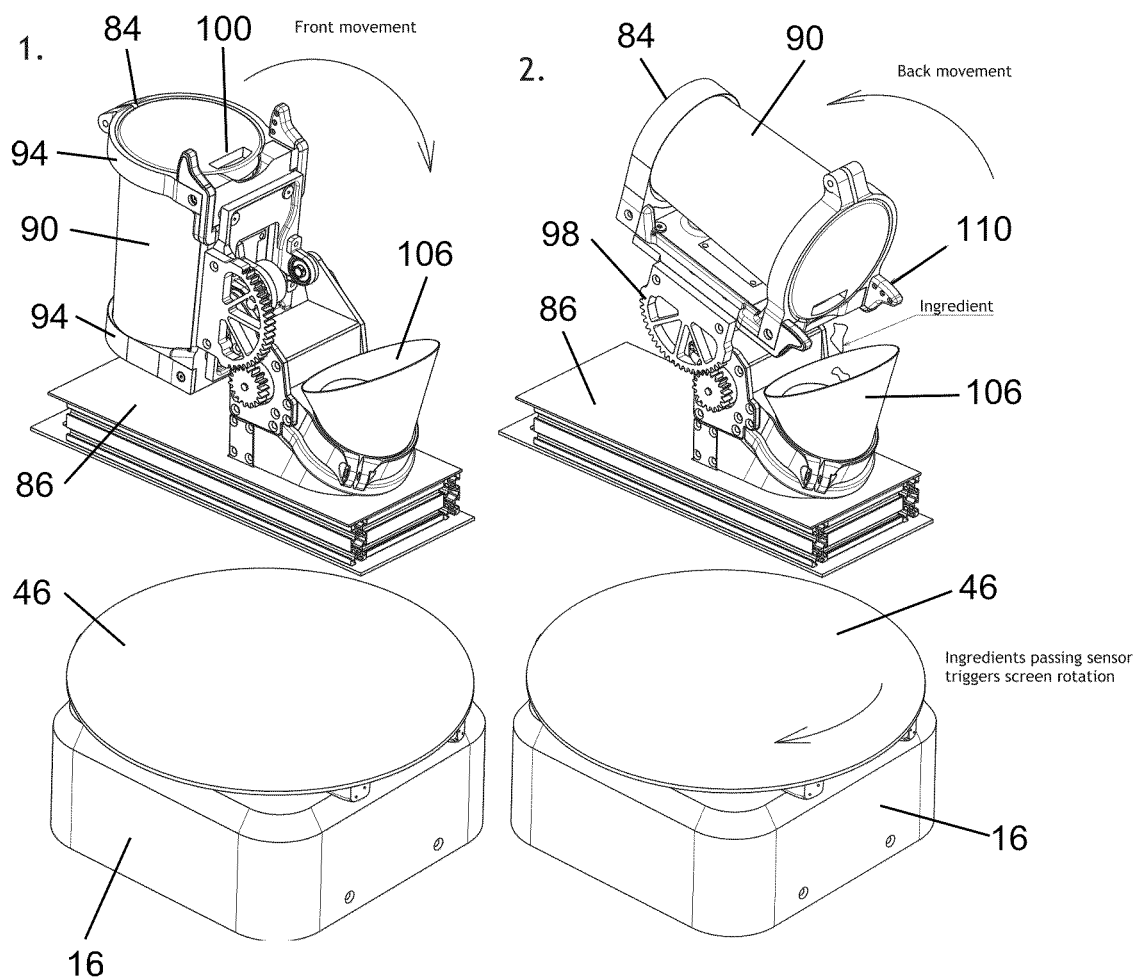
FIG. 9 is a perspective view of the low dosage spreading dispenser principle of work.

The low dosage dispensers 84, as best illustrated in FIGS. 8 and 9, can be supported by a dispenser base 86 featuring edge profiles 88 that allow the low dosage dispenser 84 to slide in and out of the dispenser matrix frame 80. The dispenser base 86 and/or the dispenser matrix frame 80 can include latches to secure the dispenser 84 in place. The ingredients container 90 can removably mounted to a container frame 92 by clamps 94, thereby allowing the ingredients container 90 to be removed for cleaning or replacement with other types of containers or devices. In the exemplary, the ingredients container 90 can be rotated about the rotation axis 96 by a partial ring or gear rack 98 associated with the container 90 and engageable with a pinion gear 102 of a container motor 104. The ingredients funnel 106 can be positioned offset from the rotation axis 96 so that upon rotation the ingredients nozzle 100 of the container 90 is received in or positioned above the opening of the ingredients funnel 106.

In the alternative, the low dosage dispensers 84 can include an auger or screw system to assist in advancing or dispensing the contents of the ingredient container 90. Still the alternative, the ingredient container 90 can be a pressurized or pressurizable container capable of holding a liquid or paste under pressure for release via a valve into the ingredient funnel 106 or directly onto the pizza crust of the food robot 16 positioned therebelow.

Further in the alternative, the ingredient container 90 can be vertically orientated to receive the ingredients from the ingredient robot 40 at a first end, with an openable door or valve associated with a second end. The second end being positioned above the ingredient funnel 106, with the door or valve configured for metered dispensing of a predetermined amount of the ingredients in the container 90, thereby omitting the components required for rotating the container 90.

Figure 10:
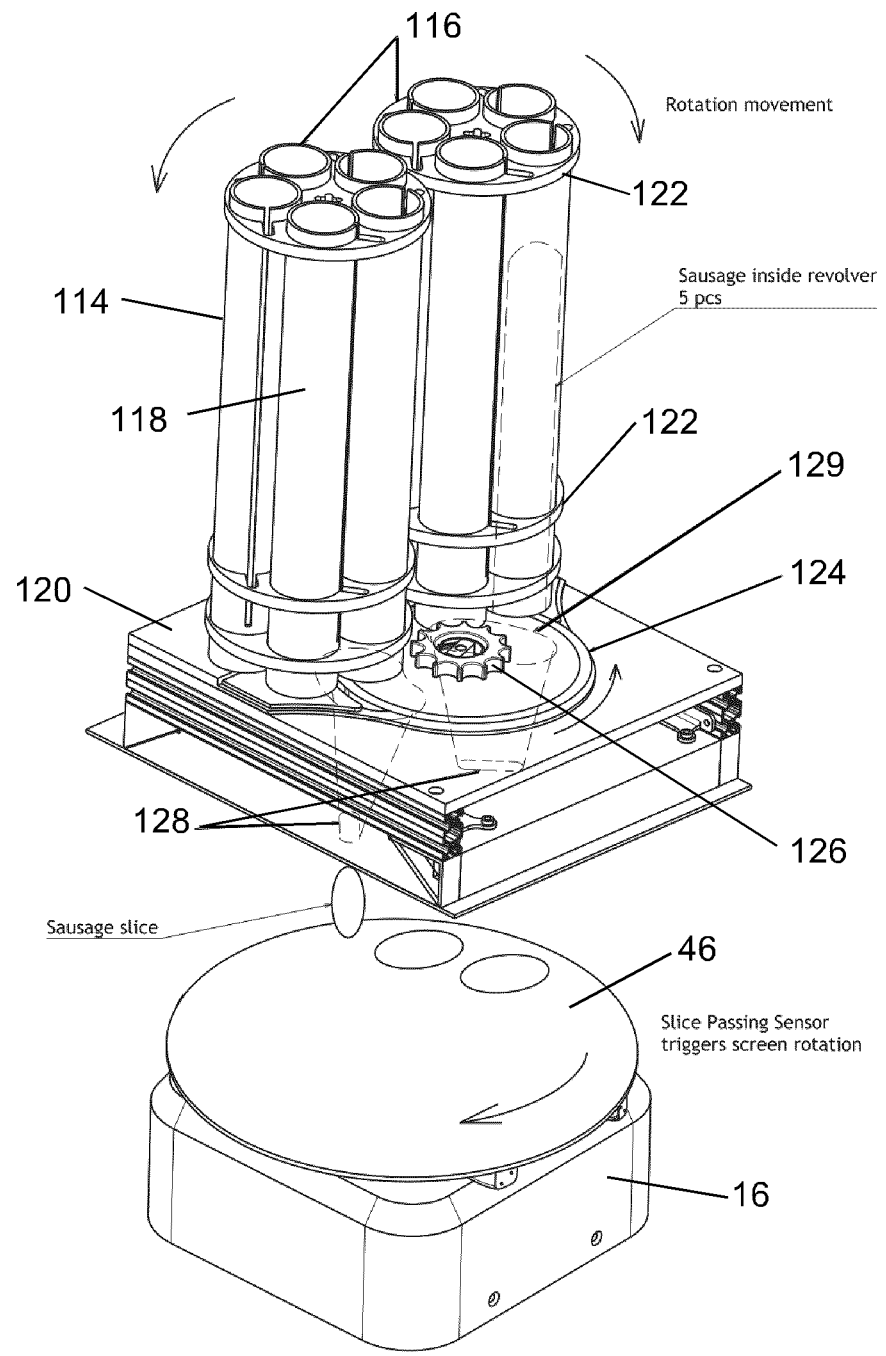
FIG. 10 is a perspective view of the revolver slicer structure and principle of work.

It can be appreciated that the sausage slicer 114, a best illustrated in FIG. 10, can be utilized for slicing any food in a tubular-like or cylindrical-like shape such as, but not limited to, olives, salami, mushrooms, pickles, cucumbers, carrots, shallots, onions, garlic, tomatoes, cheese, pepperoni, and the like. In the exemplary, the sausage slicer 114 can include multiple revolvers 116, with each revolver 116 including a plurality of food tubes 118 featuring a first end accessible by the ingredient robot 40. Each of the revolvers 116 can be rotatably supported by the dispenser base 120 so that a second end of at least one of the food tubes 118 is positioned above the disc blade 124. The revolvers 116 can include multiple tube racks 122 configured to receive and secure the multiple food tubes 118. It can be appreciated that the food tubes 118 can be removable from their tube racks 122 for cleaning and/or replacement, Each of the revolvers 116 can be rotated simultaneously and in unison, or can be rotated independently of each other.

Simultaneous rotation of the revolvers 116 can be accomplished by a motor and drive system, or by a cog or gear 126 associated with the disc blade 124 that is configured to engage with the food tubes 118 of each revolver 116. Accordingly, rotation of the disc blade 124 imparts rotation of the cog 126 that engages with at least one of the food tubes 118 of each the revolvers 116, thereby rotating each revolver 116.

The slice nozzle 128 can be associated with each of the revolvers 116 and positioned below the disk blade 124 and aligned with or offset with the second end of the food tube 118 positioned for a slicing operation.

After the food robot 16 has moved to each appropriate dispenser 80 as instructed by the computer system, the food robot 16 can then proceed to the robot elevator 140, which can be configured to accommodate multiple food robots 16 on an elevator floor or platform. The robot elevator 140 can be configured to raise its platform to position corresponding with an entrance of at least one of the oven conveyors 144. It can be appreciated that multiple oven conveyors 144 can be utilized in a stacked orientation and that each oven conveyor 144 is associated with a corresponding oven or all the oven conveyors enter a single oven capable of receiving multiple conveyors. The robot elevator 140 can include a means for raising and lowering the platform, such as but not limited to, a motorized screw, a hydraulic actuator, a scissor lifting jack, and the like. Sensors on the platform and/or the conveyors 144 can provide position information for the robot elevator 140 so that the platform is at the appropriate height.

Figure 15:
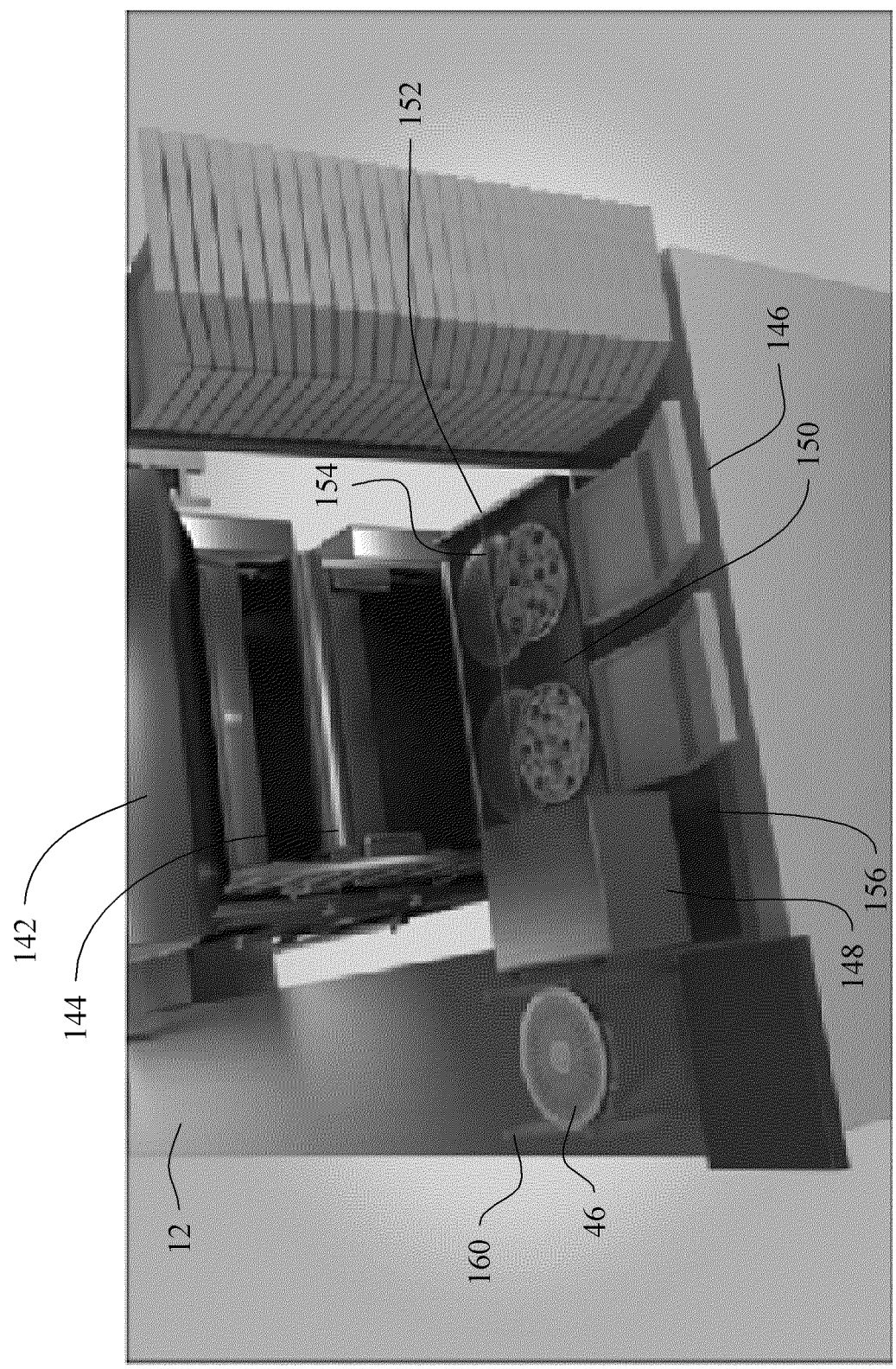
FIG. 15 is a perspective view of the packaging station, the cutter station and the header station with the pizza slider pushing the cooked pizza off the header and into an open pizza box.

Once the food robot 16 is at the appropriate height, the screen(s) 46 can be advanced off the universal clamp 18 and provided on the conveyor 140 for travel through the oven 142 for cooking. After which, the screen(s) 46 exits the oven 142 and slides onto a header conveyor 150 associated with the packaging and cutting stations 146, 148, as best illustrated in FIG. 15. While the screen 46 and the cooked pizza are on the header conveyor 150, a pizza slider 152 is operator that moves a paddle-like member 154 over and across the screen 46 to contact a side or crust of the pizza and pushes off the screen 46 and onto an awaiting open box positioned on a cutter conveyor 156.

Once the pizza is in its corresponding box, the cutter conveyor 156 can be activated that moves the open pizza box including the pizza to the cutting station 148 where the pizza is cut into a predetermined number of slices. After the cutting operation, the cutter conveyor 156 can continue to move the pizza box to the client delivery station.

After the pizza slider 152 completes its operation, the header conveyor 150 activates to move the now empty screen(s) 46 away from the packaging station 146 and dispenses the screen(s) 46 into the screen station 160 for subsequent pick up from the food robot 16 positioned therebelow. The screen station 160 can include a rack 162 for vertically holding a stack of screens 46 deposited by the header conveyor 150. The rack 162 can include food robot activated latches that release a single screen therefrom onto the universal clamp 18 of the food robot 16 positioned therebelow.

Figure 12:
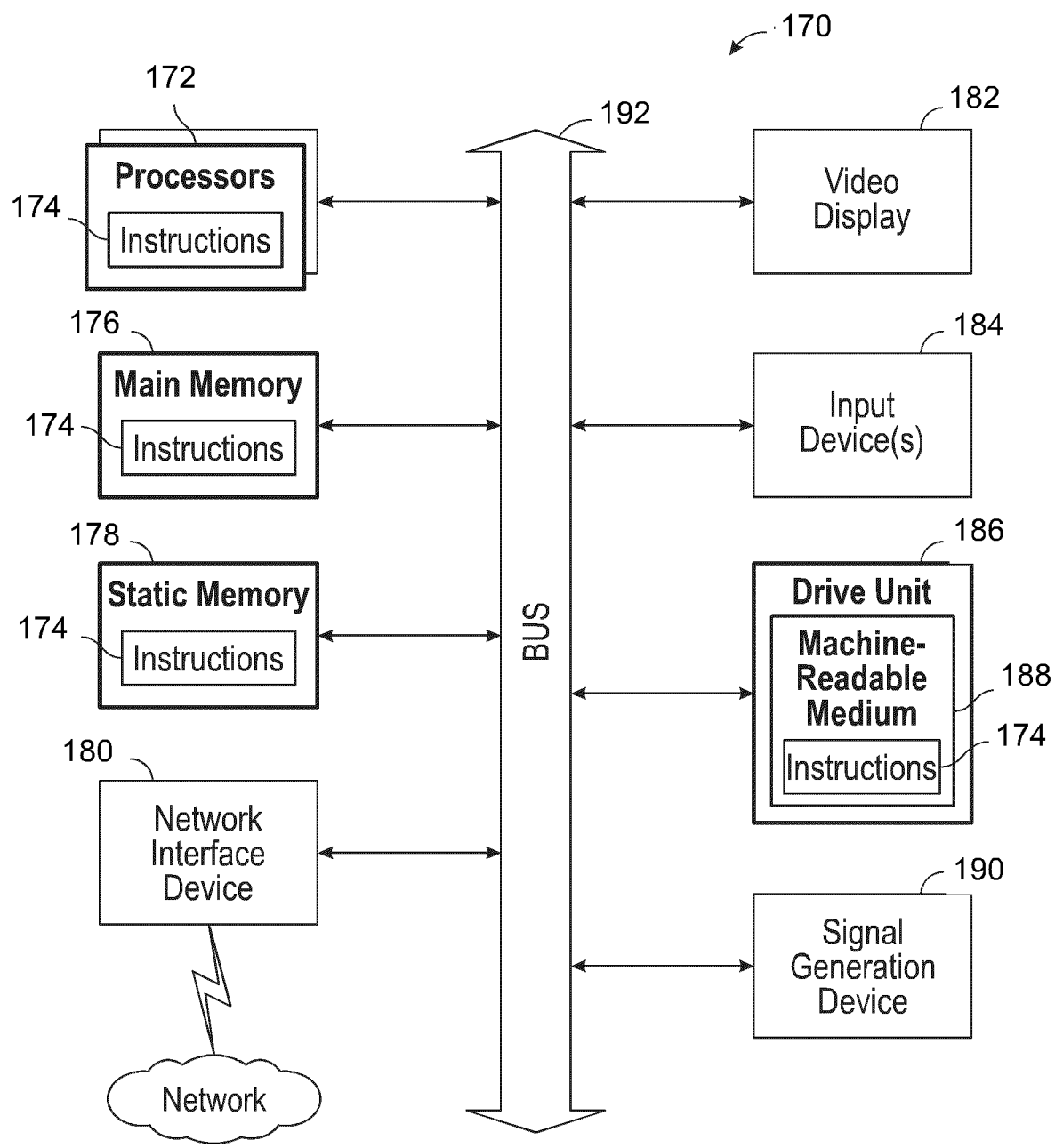
FIG. 12 illustrates an exemplary computing device that may be used to implement some embodiments of the present technology.

FIG. 12 is a diagrammatic representation of an example machine in the form of a computer system 170 which is an example of one or more of the computers referred to herein and, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 170 includes a processor or multiple processors 172 (e.g., a central processing unit (CPU), a graphics processing unit (GPU), or both), and a main memory 176 and static memory 178, which communicate with each other via a bus 192. The computer system 170 may further include a video display 182 (e.g., a liquid crystal display (LCD)). The computer system 170 may also include an alpha-numeric input device(s) 184 (e.g., a keyboard), a cursor control device (e.g., a mouse), a voice recognition or biometric verification unit (not shown), a drive unit 186 (also referred to as disk drive unit), a signal generation device 190 (e.g., a speaker), and a network interface device 180. The computer system 170 may further include a data encryption module (not shown) to encrypt data. The drive unit 186 includes a computer or machine-readable medium 188 on which is stored one or more sets of instructions and data structures (e.g., instructions 174) embodying or utilizing any one or more of the methodologies or functions described herein. The instructions 174 may also reside, completely or at least partially, within the main memory 176 and/or within the processors 172 during execution thereof by the computer system 170. The main memory 176 and the processors 172 may also constitute machine-readable media.

The instructions 174 may further be transmitted or received over a network via the network interface device 180 utilizing any one of a number of well-known transfer protocols (e.g., Hyper Text Transfer Protocol (HTTP)). While the machine-readable medium 188 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Figure 16:
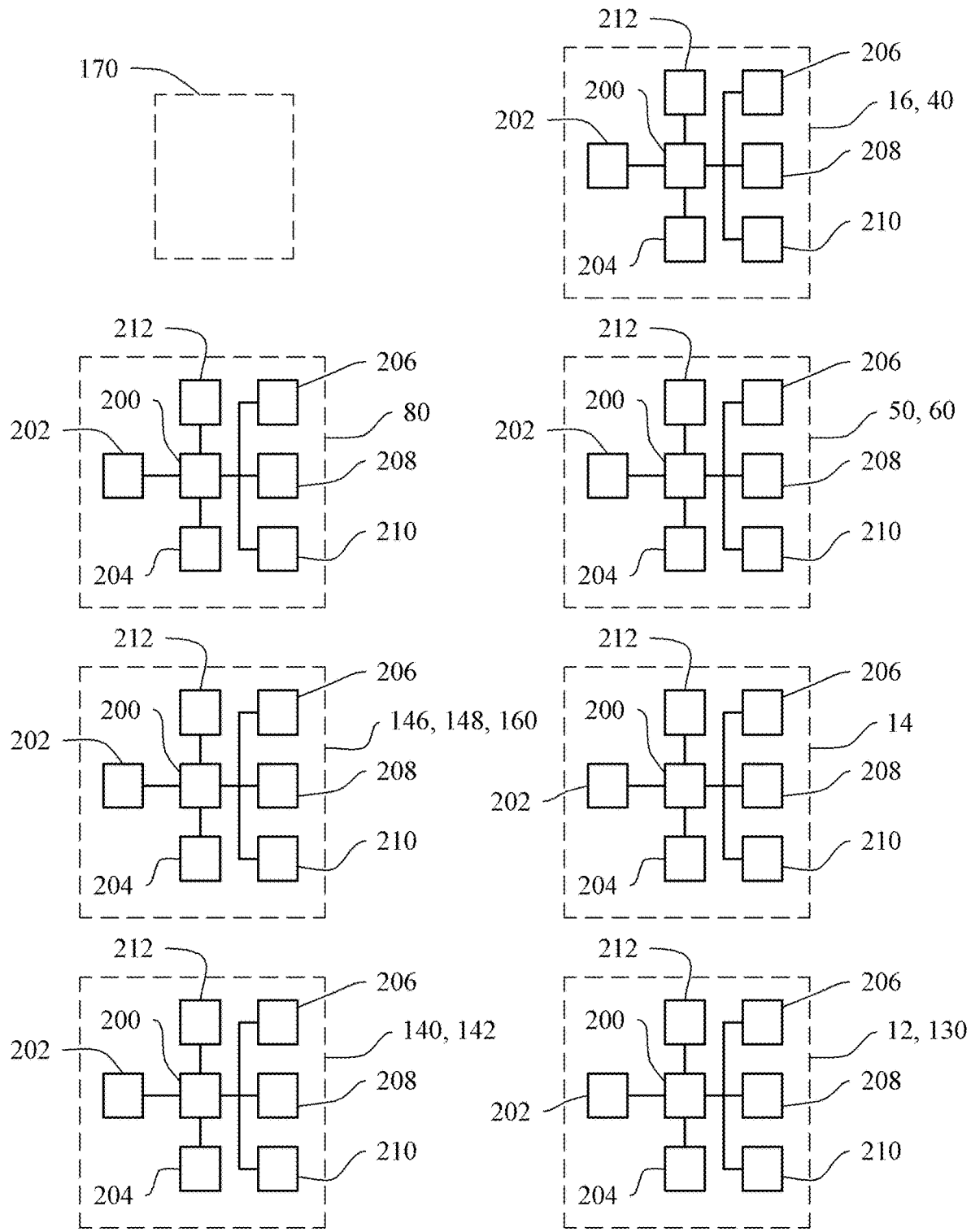
FIG. 16 illustrates an exemplary computing device and electronic components that may be used to implement some embodiments of the present technology.

FIG. 16 is a diagrammatic representation of an example machine system of the present technology including the computer system 170 in combinational and/or operational use with components of the present technology. In the exemplary, any or all of the food and ingredient robots 16, 40, the dough station 50, the dough spinner 60, the freezer 132, the charging stations 14, the bed 130, the dispenser matrix 80, the dispensers 82, the robot elevator 140, the oven station 142, the oven conveyor 144, the packaging station 146, the cutting station 148, the screen station 160 and/or the table 12 can include a processor 200, memory 202, a network interface device 204, an input device(s)/sensor(s) 206, an output device(s) 208, a camera 210, and/or a transceiver 212.

For purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure, Reference throughout this specification to "one embodiment" or "an embodiment" means that a particular feature, structure, or characteristic described in connection with the embodiment is included in at least one embodiment of the present technology. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the present technology. As used herein, the singular forms "a", "an" and "the" are intended to include the plural forms as well, unless the context clearly "a", indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

In some embodiments, method steps. processes, functions/acts disclosed herein may be performed in a different order or combination. In some embodiments, one or more steps of methods. processes, functions/acts disclosed herein may be omitted.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the described embodiments of the present technology are illustrative only and that modifications thereof may occur to those skilled in the art. Accordingly, this present technology is not to be regarded as limited to the embodiments disclosed, but is to be limited only as defined by the appended claims herein. It will further be understood that any features described in relation to any particular embodiment may be featured in combinations with other embodiments, for avoidance of doubt.

While embodiments of the flexible automatic food processing and client orders execution machine have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology.

For example, any suitable sturdy material may be used instead of the above-described. And although preparing and cooking food items per client orders utilizing flexible automatic food processing have been described, it should be appreciated that the flexible automatic food processing and client orders execution machine herein described is also suitable for processing custom orders for any food item, retail shopping, fabrication and the like.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed as being new and desired to be protected by Letters Patent of the United States is as follows:

1. A food preparing system comprising:
   one or more food robots autonomously moveable on a table, the food robots including a rotatable header for receiving a food item;
   an ingredient dispensing frame positioned above the table and including one or more modular ingredient dispensers configured to dispense an ingredient on to the food item supported by the header of at least one of the food robots positioned therebelow;
   one or more ingredient robots autonomously moveable on an ingredient bed, the ingredient robots being configured to receive the ingredient, transport the ingredient to at least one of the ingredient dispensers, and dispense the ingredient in the ingredient dispensers, the ingredient bed being separate from the table;
   a food cooking station configured to receive the header and the food item thereon, and cook the food item;
   a post-cooking station configured to receive the header and the cooked food item thereon from the food cooking station, and remove the cooked food item from the header;
   a header station configured to receive the header from the post-cooking station and provide the header to at least one of the food robots; and
   further comprising a robot elevator configured to receive the food robots and elevate the food robots to an entrance of the food cooking station.

2. The food preparing system according to claim 1, further comprising an ingredient storage configured to receive ingredient containers and provide at least one of the ingredient containers to at least one of the ingredient robots.

3. The food preparing system according to claim 2, wherein the ingredient storage is a plurality of modular freezers each featuring a container aperture and a container feeding mechanism configured to advance the ingredient containers toward the container aperture.

4. The food preparing system according to claim 3, wherein the ingredient robots including an ingredient container hopper configured to receive at least one of the ingredient containers from the container aperture.

5. The food preparing system according to claim 1, wherein the food robots each include a universal clamp configured to couple with a portion of the header, and a rotating drive device configured to rotate the universal clamp and the header coupled thereto.

6. The food preparing system according to claim 5, wherein the food robots are each configured to travel in a linear or lateral direction along the table, and simultaneously rotate the header while under one of the ingredient dispensers to distribute the ingredient being dispensed on the food item.

7. The food preparing system according to claim 1, wherein the table includes unique codes thereon readable by a camera on the food robots for determining position coordinates on the table.

8. The food preparing system according to claim 1, further comprising a computer system having at least one processing unit configured to receive a food order, provide instructions to the food robots, provide instructions to the ingredient robots, and provide instructions to the ingredient dispensers.

9. The food preparing system according to claim 1, wherein the header station is configured to receive the header from the post-cooking station in a stacked configuration with multiple empty headers, and is configured to provide at least one empty header to the food robots when positioned therebelow.

10. The food preparing system according to claim 9, wherein the post-cooking station includes a cooked food item moving mechanism, and a header conveyor, the cooked food item moving mechanism is configured to transfer the cooked food item off the header, the header conveyor is configured to move the header to a top section of the header station.

11. The food preparing system according to claim 1, further comprising a food station including a food transfer system configured to capture a food item and transfer it to a food item support.

12. The food preparing system according to claim 11, wherein the food station further includes a food item forming mechanism configured to form the food item located on the food item 5 support from a first shape to a second shape different to that of the first shape.

13. The food preparing system according to claim 12, wherein the food item support is configured to pivot to transfer the food item to the header of the food robots adjacently positioned thereto.

14. The food preparing system according to claim 12, wherein the food item forming mechanism includes a pair of opposing conical rollers configured to rotate and press against the food item.

15. The food preparing system according to claim 1, wherein one of the modular ingredient dispensers includes a container configured to receive the ingredient from one of the ingredient robots, a pivoting mechanism configured to pivot the container so that the ingredient received therein is transferred to a funnel, and a vibration device configured to vibrate the container.

16. The food preparing system according to claim 1, wherein one of the modular ingredient dispensers includes a container configured to receive the ingredient from one of the ingredient robots, a rotating disk blade configured to slice the ingredient received in the container, and a nozzle configured to receive the sliced ingredient from the disk blade.

17. A food preparing system comprising:
one or more food robots autonomously moveable on a table, the food robots including a rotatable header for receiving a food item;
an ingredient dispensing frame positioned above the table and including one or more modular ingredient dispensers configured to dispense an ingredient on to the food item supported by the header of at least one of the food robots positioned therebelow;
one or more ingredient robots autonomously moveable on an ingredient bed, the ingredient robots being configured to receive the ingredient, transport the ingredient to at least one of the ingredient dispensers, and dispense the ingredient in the ingredient dispensers, the ingredient bed being separate from the table;
a food cooking station configured to receive the header and the food item thereon, and cook the food item;
a post-cooking station configured to receive the header and the cooked food item thereon from the food cooking station, and remove the cooked food item from the header;
a header station configured to receive the header from the post-cooking station and provide the header to at least one of the food robots; and
wherein the header station is configured to receive the header from the post-cooking station in a stacked configuration with multiple empty headers, and is configured to provide at least one empty header to the food robots when positioned therebelow.

18. The food preparing system according to claim 17, wherein the post-cooking station includes a cooked food item moving mechanism, and a header conveyor, the cooked food item moving mechanism is configured to transfer the cooked food item off the header, the header conveyor is configured to move the header to a top section of the header station.

19. The food preparing system according to claim 17, further comprising an ingredient storage configured to receive ingredient containers and provide at least one of the ingredient containers to at least one of the ingredient robots.

20. The food preparing system according to claim 17, wherein the entire one or more food robots is configured to move to a position below at least one of the ingredient dispensers.

* * * * *